United States Patent Office 2,757,641
Patented Aug. 7, 1956

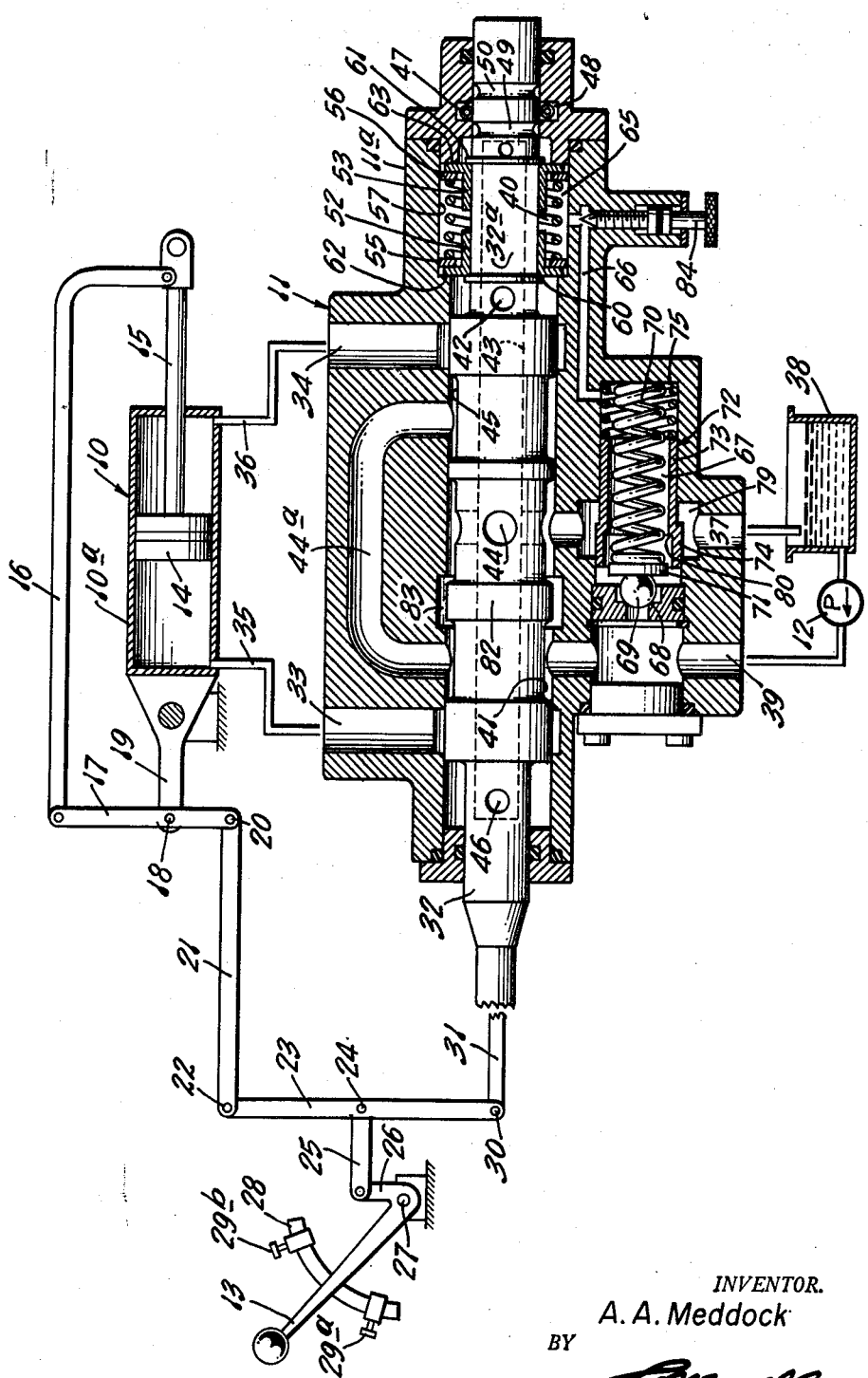

2,757,641

HYDRAULIC SELECTOR VALVE WITH AUTOMATIC HOLD AND RETURN

Alvin A. Meddock, Van Nuys, Calif., assignor to Bendix Aviation Corporation, North Hollywood, Calif., a corporation of Delaware Application October 29, 1951, Serial No. 253,711

13 Claims. (Cl. 121—41)

This invention relates to hydraulic selector valves for controlling the flow of fluid to and from hydraulic motor cylinders, and particularly to valves of this type that hold in open position until the motor completes its movement and then automatically restore to closed or neutral position.

An object of the invention is to provide a selector valve of the self-holding, automatic-restore type that is simple, reliable, and positive in its operation.

Another object is to provide a valve of this type that releases in response to a rise in pressure of the fluid flowing therethrough.

Another object is to provide a valve of this type that includes therewithin the main relief valve for the hydraulic system.

Another object is to provide a self-holding automatic-restore selector valve that can be restored either mechanically or hydraulically.

Another object is to provide a particularly simple and effective hydraulically actuated restoring mechanism for a selector valve.

Other more specific objects and features of the invention will appear from the description to follow.

Conventional selector valves such as are used, for instance, in hydraulic lift equipment for tractors and the like, often contain a centering spring that automatically restores the valve to neutral condition when the operator lets go of the control handle. However, it is known to automatically hold the valve in open condition until the motor had completed its movement, by causing a pressure drop within the valve by the fluid flowing therethrough to the motor, and utilizing this pressure drop to overcome a centering spring and hold the valve in open position. When the motor has completed its movement, and the flow of fluid through the valve ceases, the pressure drop becomes zero and the centering spring is then effective to close the valve.

The present invention differs from this prior known type of self-holding valve in that it does not rely on a pressure drop through the valve to maintain the valve in open position. Instead, a mechanical detent is used to releasably retain the valve in open position, and the valve is closed at the end of the motor stroke by hydraulic means which is responsive to the pressure of the fluid. During movement of the motor, the pressure of the fluid is proportionate to the load that the motor is handling and is well below the maximum pressure that the pump can develop. However, when the motor reaches the end of its stroke, the pressure in the system rises to a maximum, which is usually determined by the setting of a relief valve somewhere in the system. In accordance with the present invention, the relief valve for the system is positioned in the selector valve itself, and when it opens it delivers pressure fluid to surfaces on the movable valve element to develop a force effective to overcome the detent means and restore the valve to neutral position. I prefer to also use a centering spring, of insufficient force to overcome the detent, so that after the pressure-actuated release mechanism has functioned to overcome the detent and start the valve element moving into closed position, the spring is capable of continuing the movement into fully closed position. These valves are usually, although not necessarily, of the open-center type in which, when the valve is in neutral position, fluid from the pump is circulated through the valve directly to exhaust, thereby preventing the building up of any pressure. If the valve opened the ports to relieve the fluid pressure before the valve reached the neutral position, as often occurs, then the hydraulic mechanism would be ineffective to complete movement into neutral position. The centering spring, however, takes over and completes the movement.

It would be undesirable to apply the full flow of fluid to the valve-restoring mechanism in response to opening of the relief valve. I therefore provide an auxiliary relief valve which bypasses most of the flow through the main relief valve back to exhaust, but maintains sufficient pressure to operate the valve-restoring mechanism.

A feature of the invention is a particularly simple and effective structure combining both spring restoration and hydraulic restoration of the valve to neutral position.

Another feature of the invention is a particularly simple and effective double relief valve structure for providing a suitable pressure of fluid for actuation of the valve-restoring mechanism in response to opening of the main relief valve.

The manner in which the foregoing together with other more specific objects and features of the invention are attained will be apparent from the following detailed description of a particular embodiment of the invention, as disclosed in the drawing.

In the single figure of the drawing there is shown a schematic diagram of a hydraulic actuating system incorporating the invention.

Referring to the drawing, the system therein disclosed comprises a motor cylinder 10, a valve 11, a pump 12, and a control handle 13.

The motor 10 is shown as comprising a cylinder 10a, having a piston 14 therein connected to a piston rod 15 which extends through the right end of the cylinder and is connected by a link 16 to one end of a lever 17 which is fulcrumed intermediate its ends by a pin 18 to a stationary support 19 secured to the motor cylinder 10a. The other end of the lever 17 is connected by a pin 20 to one end of a link 21, the other end of which is pinned by a pin 22 to one end of a lever 23 which is fulcrumed by a pin 24 to one end of a link 25, the other end of which is pivotally connected to a short arm 26 on the control handle 13. The control handle 13 is rotatable or swingable about a stationary pivot 27 and is provided with a quadrant 28 to which limit stops 29a and 29b may be attached. The lower end of the lever 23 is connected by a pin 30 to an extension 31 on the movable element 32 of the valve 11.

The valve 11 is a selector valve of the 4-way type having a body 11a containing ports 33 and 34 connected by lines 35 and 36, respectively, to opposite ends of the motor cylinder 10a, an exhaust port 37 adapted to deliver exhaust fluid to a reservoir 38, and an inlet port 39 connected to the output of the pump 12 which draws fluid from the reservoir 38. The valve body 11a contains the movable element 32 which comprises a piston with annular grooves thereon so positioned as to connect the two motor ports 33 and 34 and the exhaust port 37 and the inlet or pressure port 39 in a desired manner to be subsequently described. The movable element 32 is normally maintained in a neutral position, as shown in the drawing, by a centering spring 40. In neutral position, both of the motor ports 33 and 34 are blocked, and the pressure port 39 is connected to the exhaust port 37. If the valve element 32 is shifted to the left, the pressure port 39 is disconnected from the exhaust port 37 and is connected through an annular groove 41 on the valve element 32 to the motor port 33 and thence to the left end of the motor cylinder 10a. At the same time, the right end of the cylinder 10a is connected through the line 36 and the motor port 34 to the exhaust port 37, through a port 42, a passage 43 and a port 44 in the valve element 32, to cause movement of the motor piston 14 to the right. On the other hand, if the valve element 32 is moved from neutral position to the right, pressure fluid from the inlet port 39 is admitted through the groove 41 on the valve element 32, into a passage 44a in the valve housing, and then through a groove 45 in the valve element into the motor port 34, and thence to the right end of the motor cylinder. At the same time, the left end of the motor cylinder is connected to exhaust through a path that may be traced from the motor port 33 in the valve, through a port 46 in the element 32, into the central passage 43 therein, and thence out through the port 44 to the exhaust port 37.

A detent mechanism is provided to yieldably retain the valve element 32 in either open position after it has once been moved there. This detent mechanism comprises a garter spring 47 positioned within an annular groove 48 in the valve housing 11a, and a pair of spaced-apart annular grooves 49 and 50 respectively, in the valve element 32, adjacent the right end thereof. When the valve is in neutral position, as shown, the grooves 49 and 50 are disposed on opposite sides of the garter spring 47, but if the element is moved to the left into open position, the garter spring 47 engages the groove 50. On the other hand, if the valve element 32 is moved to the right into open position, the garter spring 47 engages the groove 49.

As previously indicated, the valve is provided with a centering spring 40. This centering spring functions to fully restore the valve element 32 to neutral position after it has been initially moved out of either open position sufficiently to disengage the garter spring 47 from whichever one of the grooves 49 or 50 it was in engagement with. However, the spring 40 has insufficient force to dislodge the element 32 from open position against the force of the retaining spring 47.

The centering mechanism comprises, in addition to the centering spring 40, a pair of annular flanged sleeves or members 52 and 53 respectively, which are disposed upon a cylindrical portion 32a of the movable element. These annular sleeves or members 52 and 53 are provided with radially extending flanges at their end edges and are constantly urged apart by the centering spring 40, which is compressed between a pair of washers 55 and 56 respectively, which bear against the flanges on the sleeves 52 and 53. The flanges on the sleeves 52 and 53 are constructed so they will not engage the surface of a cylindrical or auxiliary chamber 57 in the valve housing 11a in which the centering mechanism is positioned. On the other hand, the washers 55 and 56 are of a size to fit the chamber 57, but have an internal hole therethrough large enough to pass freely about the cylindrical portions of the sleeves 52 and 53. Separating movement of the sleeves 52 and 53 with respect to the valve element 32 is limited by a pair of stop members on the latter, which stop members may consist of a pair of snap rings 60 and 61 positioned in grooves in the movable element 32. Separating movement of the sleeves 52 and 53 with respect to the valve body 11a is limited by shoulders 62 and 63 at opposite ends of the cylindrical surface 57 in the valve housing. It will be observed that movement of the valve element 32 in either direction will move one of the sleeves 52 or 53 in direction to compress the centering spring 40, so that the latter always exerts a force urging the movable valve element into neutral position.

The structure consisting of the sleeves 52 and 53 and the washers 55 and 56 forms a rough but imperfect fluid seal at each end of the chamber 57. By introducing hydraulic fluid under pressure into the chamber, it can be caused to exert longitudinal forces against the washers 55 and 56 and against the flanges on the sleeves 52 and 53 to aid the spring 40 in urging the valve member 32 into neutral position. However, fluid can leak past the sleeves and washers sufficiently fast to permit manual actuation of the valve out of neutral position, or spring restoration into neutral position.

Fluid is introduced into the chamber 65, to initiate movement of the element 32, through a passage 66 from the right end of a chamber 67 in the valve housing. The left end of this chamber 67 includes a valve seat 68 with the pressure port 39 from which regulated pressure fluid is directed to passage 66. The valve seat is closed by a poppet ball 69 which is urged thereagainst by a helical compression spring 70 which is compressed between the right end of the chamber 67 and a retainer 71 which bears against the poppet ball 69.

The spring 70 is relatively stiff, so that the ball poppet 69 opens only in response to relatively high pressures. It is undesirable that such high pressures be applied to the chamber 65 of the restoring mechanism. Hence a second relief valve structure is provided to vent the chamber 67 to the exhaust port 37 in response to a relatively low pressure. This second relief valve structure comprises a stepped sleeve 72 having a right end portion 73 of one diameter, and a left end portion 74 of a slightly larger diameter. The right end of the chamber 67 is cylindrical and of a diameter to fit the small portion 73 of the sleeve 72, whereas the left end portion of the chamber 67 is of larger diameter to fit the large end portion 74 of the sleeve. The sleeve is urged to the left by a helical spring 75, compressed between the right end of the sleeve and the right end of the chamber 67, into a position in which it covers an annular passage 79 which is connected to the exhaust port 37, and in fact constitutes a connecting passage between the port 37 and the main bore of the valve housing.

It will be observed that pressure fluid in the chamber 67 exerts a force against the right end of the sleeve 72, urging it to the left in aiding relation to the spring 75. However, the same pressure exerts a force against the left end of the sleeve and also against a shoulder 80 at the juncture of the large diameter section 74 with the small diameter section 73. The resultant force of pressure fluid acting on the left end of the sleeve and against the shoulder 80 exceeds the force of the pressure fluid acting against the right end of the sleeve, and when the pressure within the chamber 67 reaches a predetermined value, this force is sufficient to compress the spring 75 and move the sleeve to the right, opening a passage from the chamber 67 into the annular exhaust passage 79. The pressure required to open the main relief valve poppet 69 may be relatively high, say in the neighborhood of 1000 pounds, whereas the pressure required to shift the sleeve 72 and bypass fluid from the chamber 67 to exhaust may be only 25 pounds. This pressure of 25 pounds is the maximum steady state pressure that can be applied to the chamber 65 where the valve-restoring elements are located. The sleeve 72 need not be stepped internally, it being the external stepping that provides the differential area necessary for operation, although as stated, the sleeve 72 limits the steady state pressure in chamber 67 to a constant, low, value, a transient high pressure surge is produced in the chamber 67 immediately following the opening of the relief poppet 69, before the sleeve 72 has time to open. This momentary surge, if freely transmitted to the chamber 65 might kick the valve element 32 into neutral position so violently that its momentum would carry it beyond the neutral position. It is therefore desirable to restrict the flow through the passage 66 into the chamber 65, as by a needle valve 84. Alternatively, the desired restricted flow can be obtained by simply making the passage 66 sufficiently small.

The structure described operates as follows:

Let it be assumed first that it is desired that the valve 11 be restored to neutral position only in response to movement of the motor piston 14 to the end of its stroke.

Under these conditions, the stops 29a and 29b on the quadrant 28 associated with the control lever 13 would not be employed, and they would either be removed from the quadrant or moved near the ends thereof beyond the range of movement of the lever 13. Let it also be assumed that the motor piston 14 is to be moved to the right end of its stroke. The operator would move the operating lever 13 counterclockwise to the limit of its motion. This moves the link 25 to the left, causing the lever 23 to pivot clockwise about its upper end pivot 22, and shift the valve member 23 to the left. The valve will remain in its leftmost position because of engagement of the garter spring 47 in the groove 50. The control lever 13 will likewise initially hold in the extreme counterclockwise position to which it has been moved. Movement of the valve element 32 to the left will, as previously described, admits pressure fluid from the pump 12 to the left end of the motor cylinder 10a and permits discharge of exhaust fluid from the right end of the motor cylinder to the exhaust port 37 and thence back to the reservoir 38. The motor piston 14 therefore moves to the right. Rightward movement of the piston 14 carries the link 16 with it, rocking the lever 17 clockwise about its pivot 18, and moving the link 21 and the upper end of the lever 23 to the left. This causes the control lever 13 to move further clockwise in synchronism with the motor piston.

So long as the motor piston 14 can move, the pressure developed back of it will be less than the maximum value the system is intended to handle, and less than the value at which the main relief valve poppet 69 opens. Therefore, during this period the exhaust pressure existent in the port 37 exists in the chamber 65. However, when the motor piston 14 reaches the end of its stroke, the flow of fluid from the pump 12 into cylinder 10a is stopped, and the pressure rises to the maximum value the system is intended to carry, whereupon the main relief valve poppet 69 opens, admitting pressure fluid into the chamber 67. This pressure moves the sleeve 73 to the right to permit discharge direct to the exhaust port 37 of the main stream of fluid, but maintain a pressure within the chamber 67 which is applied through the passage 66 to the chamber 65 and is effective against the washers 55 and 56. Since the sleeve 52 and the washer 55 are prevented from moving to the left by contact with the housing shoulder 62 there can be no movement of those parts. However, when the valve element 32 was moved to the left to cause the garter spring 47 to engage with the groove 50, the sleeve 53 and the washer 56 were carried away from the shoulder 63, compressing the spring 40 in so doing. The pressure applied from the chamber 67 through the passage 66 to the chamber 65, is sufficient in conjunction with the force of the spring 40 to disengage the garter spring 47 from the groove 50, permitting rightward movement of the valve element 32. As soon as the movement has progressed far enough to completely disengage the garter spring, the force of the spring 40 is sufficient to complete the movement of the valve element 32 back to neutral position. This is important, because the rightward movement of the valve element 32 carries a land 82 thereof into the housing groove 83 before neutral position is reached, thereby permitting bypass of pressure fluid from the pressure port 39 of the valve directly to the exhaust port 37, destroying the pressure in the system, so that if pressure alone were relied upon, it would not positively restore the valve fully to neutral position.

If it is desired to stop the motor piston 14 automatically in a position short of its full stroke, one of the stops is shifted inwardly along the quadrant 28 and locked into position. Thus if it is assumed, that, as before, the motor piston is to be moved to the right but is to be stopped short of its rightmost limit position, the stop member 29a on the lower end of the quadrant 28 would be moved toward the center of the quadrant so as to be contacted by the control lever 13 in response to movement of the latter into a position corresponding to the desired limit position of the motor piston 14. As previously indicated, movement of the motor piston 14 causes simultaneous movement of the control lever 13 because of the linkage consisting of the link 16, the lever 17, the link 21, and the lever 23. When the lever 13 contacts the stop 29a, further pivotal movement counterclockwise of the lever 23 about its lower end pivot 30 is prevented and thereafter it pivots about its center pivot 24. This causes the lower end of the lever to move to the right, disengaging the garter spring 47 from the groove 49 and permitting the centering spring 40 to move the valve back to neutral position, as previously described.

It will be apparent from the foregoing description that the invention provides:

A. A self-holding valve that automatically restores to neutral position in response to stoppage of the motor it controls.

B. A self-holding valve that automatically restores in response to a pressure rise sufficient to open the relief valve of the system, but that will not restore in response to any lesser pressure.

C. A pressure-restored valve the restoring mechanism of which is protected against excessive pressures.

D. A pressure-restored valve that is positive in operation.

E. A self-holding selector valve of simple construction that can be restored either mechanically, or hydraulically in response to an excessive pressure rise. The terms "right" or "left" or any other directional terms are intended to have only a relative connotation to aid in describing the device and are not intended to be interpreted as requiring any particular orientation with respect to any external elements.

Although for the purpose of explaining the invention, a particular embodiment thereof has been shown and described, obvious modifications will occur to a person skilled in the art, and I do not desire to be limited to the exact details shown and described.

I claim:

1. In a hydraulic selector valve including a housing, an inlet port for receiving pressure fluid and exhaust port to be connected to a fluid reservoir, a pair of motor ports to be connected to a controlled fluid motor, a reciprocable fluid control member for connecting said inlet port to one of said motor ports while the other motor port is connected to said exhaust port when said control member is moved to one position, and isolating both of said motor ports from said inlet port when said control member is in a neutral position, an auxiliary chamber in said housing; a portion of said control member being reciprocable in said auxiliary chamber; said control member having cooperating therewith holding means for yieldably retaining said control member in a fixed position when said control member is moved from a neutral position; said portion of said control member in said auxiliary chamber having operatively associated therewith actuating means and fluid pressure responsive means in said auxiliary chamber to overcome the holding means for said control member; said actuating means arranged to aid said fluid pressure means in returning said control member to a neutral position, cooperating stop means in said chamber and on said actuating means to permit said actuating means to become operative when said control member is moved from a neutral position, and pressure responsive means arranged to permit controlled fluid pressure from said inlet port to said auxiliary chamber, providing fluid pressure to said fluid pressure responsive means to aid in returning said control member to a neutral position.

2. A hydraulic selector valve as set forth in claim 1 wherein said holding means consists of means on said control member cooperating with means in said housing.

3. In a hydraulic selector valve as set forth in claim 2 wherein said holding means comprises groove means on said control member and means for yieldingly retaining said control member comprises spring means on said control member arranged to cooperate therewith.

4. A hydraulic selector valve as set forth in claim 3 wherein said actuating means consists of a spring on said portion of the actuating member extending into said auxiliary chamber; said fluid pressure responsive member consisting of fluid metering washers mounted on said portion of said actuating member in contact with said spring, said washers adapted to function with said cooperating stop means to return said actuating member to neutral position.

5. A hydraulic selector valve as set forth in claim 4 wherein said actuating means is a helical spring and said cooperating stop means includes shoulder portions integral with said auxiliary chamber and flange members mounted on the portion of said actuating member in said auxiliary chamber, said flange members being engageable with the washer members.

6. In a hydraulic selector valve: a housing containing an inlet port for receiving pressure fluid, an exhaust port, a pair of motor ports, and a reciprocable valve element cooperating with said housing for connecting said inlet port to one motor port and said exhaust port to the other motor port when in one end position and isolating both motor ports when in a neutral position; detent means on said housnig and valve element for yieldably retaining said element in said one end position; a cylindrical plunger member connected to and movable with said valve element; a cylindrical wall member in said housing concentrically surrounding said plunger member and defining therewith an annular chamber; means forming a fluid seal between said members at one end of said annular chamber; an annular member closing the other end of said annular chamber; stop means on said plunger member engageable with said annular member for moving said annular member into said chamber in response to movement of said valve element from neutral position into said one end position, and for restoring said valve element into neutral position in response to movement of said annular member against said stop member; and pressure-responsive valve means for connecting said inlet port to said annular chamber in response to predetermined pressure in said inlet port; said selector valve including a centering spring and means for stressing it between said valve element and said housing to urge said valve element toward neutral position, the force of said spring being less than the retaining force of said detent means and greater than the frictional resistance to movement of said valve element; said centering spring being a helical compression spring in said chamber compressed between said sealing means and said annular member; said annular member having a tubular section on said plunger member and having a radially extending flange of less radius than said chamber, and a washer having a flat end face lying against said flange and having a cylindrical outer face contacting said chamber wall, said washer being interposed between said centering spring and said flange.

7. In a hydraulic selector valve: a housing containing an inlet port for receiving pressure fluid, an exhaust port, a pair of motor ports, and a reciprocable valve element cooperating with said housing for connecting said inlet port to one motor port and said exhaust port to the other motor port when in one end position and isolating both motor ports when in a neutral position; detent means on said housing and valve element for yieldably retaining said element in said one end position; a cylindrical plunger member connected to and movable with said valve element; a cylindrical wall member in said housing concentrically surrounding said plunger member and defining therewith an annular chamber; means forming a fluid seal between said members at one end of said annular chamber; an annular member closing the other end of said annular chamber; stop means on said plunger member engageable with said annular member for moving said annular member into said chamber in response to movement of said valve element from neutral position into said one end position, and for restoring said valve element into neutral position in response to movement of said annular member against said stop means; and pressure-responsive valve means for connecting said inlet port to said chamber in response to predetermined pressure in said inlet port; said valve means for connecting said inlet port to said chamber comprising a high pressure relief valve means connecting said inlet port with said chamber for admitting pressure fluid from said inlet port to said chamber in response to a predetermined high pressure in said inlet port; and low pressure relief valve means connecting said chamber to said exhaust port for limiting the pressure supplied to said chamber to a predetermined low value substantially less than said predetermined high pressure.

8. In a hydraulic selector valve: a housing containing an inlet port for receiving pressure fluid, an exhaust port, a pair of motor ports, and a reciprocable valve element cooperating with said housing for connecting said inlet port to one motor port and said exhaust port to the other motor port when in one end position and isolating both motor ports when in a neutral position; detent means on said housing and valve element for yieldably retaining said element in said one end position; a cylindrical plunger member connected to and movable with said valve element; a cylindrical wall member in said housing concentrically surrounding said plunger member and defining therewith an annular chamber; first means forming a fluid seal between said members at said one end of said annular chamber; an annular member closing the other end of said annular chamber; stop means on said plunger member engageable with said annular member for moving said annular member into said chamber in response to movement of said valve element from neutral position into said one end position, and for restoring said valve element into neutral position in response to movement of said annular member against said stop means; and pressure-responsive valve means for connecting said inlet port to said chamber in response to predetermined pressure in said inlet port; said valve means for connecting said inlet port to said chamber comprising a high pressure relief valve means for admitting pressure fluid from said inlet port to said chamber in response to a predetermined high pressure in said inlet port; and low pressure relief valve means connecting said chamber to said exhaust port for limiting the pressure in said chamber to a predetermined low value substantially less than said predetermined high pressure; said high pressure relief valve including an elongated valve chamber in said housing having a valve seat in one end communicating with said inlet port; a passage communicating the other end with said annular chamber; an exhaust passage communicating said exhaust port with said valve chamber at a point intermediate its ends; said valve chamber having a stepped cylindrical wall of larger diameter between said exhaust passage and said one end than between said exhaust passage and said other end; a stepped sleeve fitting said stepped cylinder walls and reciprocable between a one position adjacent said one end in which it covers said exhaust passage and another position nearer said other end in which it uncovers said exhaust passage; spring means urging said sleeve into said one position; a poppet in said valve chamber for closing said valve seats, and spring means urging it against said valve seat.

9. In a hydraulic valve of the type having a movable valve member adapted to communicate a pressure port with a discharge port when in one position and to close off a communication between the pressure port and the discharge port when in another position, detent means adapted to hold said movable valve member in said one position, spring biasing means adapted to move said movable valve member from said one position to the other position when said movable valve member is released by said detent means, and means connected to said pressure port and adapted to cause said detent means to release said movable valve member when the pressure in said pressure port exceeds a predetermined limit.

10. In a hydraulic selector valve of the type having a movable valve member adapted to communicate a pressure port with a first discharge port when the movable valve member is in one position and to communicate the pressure port to a second discharge port when the movable valve member is in a second position, detent means adapted to hold said movable valve member in either of said first and second positions, spring centering means adapted to move said movable valve member to a neutral position between said first and second positions when said movable valve member is released by said detent means, and means connected to said pressure port and adapted to cause said detent means to release said movable valve member when the pressure in said pressure port exceeds a predetermined limit.

11. In combination with a hydraulic valve of the type having a movable valve member adapted to communicate a pressure port with a discharge port when in one position and to close off communication between the pressure port and the discharge port when in another position; detent means adapted to hold said movable valve member in said one position; spring biasing means adapted to move said movable valve member from said one position to the other position when said movable valve member is released by said detent means; a two stage relief valve comprising a first stage adapted to relieve pressure from said pressure port to a relief valve chamber when the pressure at said pressure port reaches a predetermined limit, a second stage adapted to control the pressure in said relief valve chamber at a predetermined level; and means connected to said relief valve chamber and adapted to cause said detent means to release said movable valve member when the pressure in said relief valve chamber reaches a predetermined level.

12. A two stage relief valve and the like comprising a body member having an internal chamber comprising axially aligned cylindrical sections of different diameter and having an entrance port and an internal valve seat therein, said chamber also having an exhaust port in the side walls of one of said cylindrical sections, a stepped generally tubular exhaust port closure member in substantial sealing engagement with the side walls of both cylindrical sections, said exhaust port closure member being adapted to close off said exhaust port when in one position and to open said exhaust port when moved toward the smaller diameter cylindrical section, a first spring biasing said exhaust port closure member in the direction of the larger diameter section to close said exhaust port, an entrance port closure member biased against said internal valve seat, and said chamber also having a third port adapted to conduct the intermediate pressure as determined by said stepped exhaust port closure member away from said chamber.

13. A two stage relief valve comprising a body member having an enclosed chamber comprising axially aligned cylindrical sections of different diameters and having an entrance port and internal valve seat in one end wall of said chamber, said chamber having an exhaust port in the side walls of one of said cylindrical sections, a stepped generally tubular exhaust port closure member in substantial sealing engagement with the side walls of both cylindrical chamber sections, said exhaust port closure member being adapted to close off said exhaust port when in one position and to open said exhaust port when moved toward the smaller diameter cylindrical section, a first coil spring biasing said exhaust port closure member in the direction of the larger diameter section to close said exhaust port, an entrance port closure member adapted to abut said internal valve seat, and a second coil spring biased between said other end wall of said chamber and said entrance port closure member and extending through said tubular member, said chamber also having a third port adapted to conduct the intermediate pressure as determined by said stepped exhaust port closure member away from said chamber.

References Cited in the file of this patent

UNITED STATES PATENTS

| | | |
|---|---|---|
| 2,231,583 | Konig | Feb. 11, 1941 |
| 2,256,970 | Bryant | Sept. 23, 1941 |
| 2,316,445 | Marshall | Apr. 13 1943 |
| 2,342,450 | Campbell | Feb. 22, 1944 |
| 2,395,941 | Rockwell | Mar. 5, 1946 |
| 2,396,643 | Ganahl | Mar. 19, 1946 |
| 2,448,557 | Stephens | Sept. 7, 1948 |
| 2,511,393 | Worthington | June 13, 1950 |
| 2,536,965 | Taylor | Jan. 2, 1951 |
| 2,594,664 | Livers et al. | Apr. 29, 1952 |